(12) United States Patent
Nakagawa

(10) Patent No.: US 10,834,553 B2
(45) Date of Patent: Nov. 10, 2020

(54) VEHICLE COMMUNICATION SYSTEM

(71) Applicant: TOYOTA JIDOSHA KABUSHIKI KAISHA, Toyota (JP)

(72) Inventor: Masashi Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/845,387

(22) Filed: Dec. 18, 2017

(65) Prior Publication Data
US 2018/0184274 A1    Jun. 28, 2018

(30) Foreign Application Priority Data

Dec. 26, 2016 (JP) ................................ 2016-251968

(51) Int. Cl.
| | |
|---|---|
| *H04W 4/48* | (2018.01) |
| *G07C 5/00* | (2006.01) |
| *H04L 29/08* | (2006.01) |
| *H04W 4/44* | (2018.01) |
| *G01C 21/26* | (2006.01) |
| *H04W 4/80* | (2018.01) |

(52) U.S. Cl.
CPC ............ *H04W 4/48* (2018.02); *G01C 21/265* (2013.01); *G07C 5/008* (2013.01); *H04L 67/12* (2013.01); *H04W 4/44* (2018.02); *H04W 4/80* (2018.02)

(58) Field of Classification Search
CPC ........ H04W 4/48; H04W 4/44; G01C 21/265; G07C 5/008; H04L 67/12
See application file for complete search history.

(56) References Cited

U.S. PATENT DOCUMENTS

| | | | | |
|---|---|---|---|---|
| 5,832,394 | A * | 11/1998 | Wortham ............... | G01D 4/004 701/1 |
| 7,319,848 | B2 * | 1/2008 | Obradovich ........... | G01C 21/26 455/99 |
| 8,630,768 | B2 * | 1/2014 | McClellan ............ | G01S 5/0027 701/36 |

(Continued)

FOREIGN PATENT DOCUMENTS

| | | |
|---|---|---|
| CN | 103502057 A | 1/2014 |
| EP | 2716502 A1 | 4/2014 |

(Continued)

*Primary Examiner* — Peter D Nolan
*Assistant Examiner* — Wae L Louie
(74) *Attorney, Agent, or Firm* — Hunton Andrews Kurth LLP

(57) ABSTRACT

A vehicle communication system includes a first on-board device a first on-board device installed in a vehicle and a first communication device configured to be connected to the first on-board device. Individual identification information used to identify the first communication device as an individual communication terminal is added to the first communication device. The first communication device is configured to transmit the individual identification information to the first on-board device. The first on-board device is configured to associate vehicle information of the vehicle with the individual identification information and transmit the vehicle information associated with the individual identification information to an information device via the first communication device.

7 Claims, 9 Drawing Sheets

(56) References Cited

U.S. PATENT DOCUMENTS

| 9,035,791 B2* | 5/2015 | Matsumoto | G06Q 50/06 340/870.02 |
| 9,091,537 B2* | 7/2015 | Farr | G06F 7/00 |
| 2008/0037504 A1* | 2/2008 | Jeon | H04L 12/64 370/342 |
| 2014/0073254 A1* | 3/2014 | Ichihara | H04W 76/14 455/41.2 |
| 2014/0270172 A1* | 9/2014 | Peirce | H04L 63/08 380/270 |
| 2015/0254909 A1* | 9/2015 | Harata | G07C 5/0808 701/31.5 |

FOREIGN PATENT DOCUMENTS

| JP | 2014-078801 A | 5/2014 |
| WO | 2016092363 A1 | 6/2016 |

\* cited by examiner

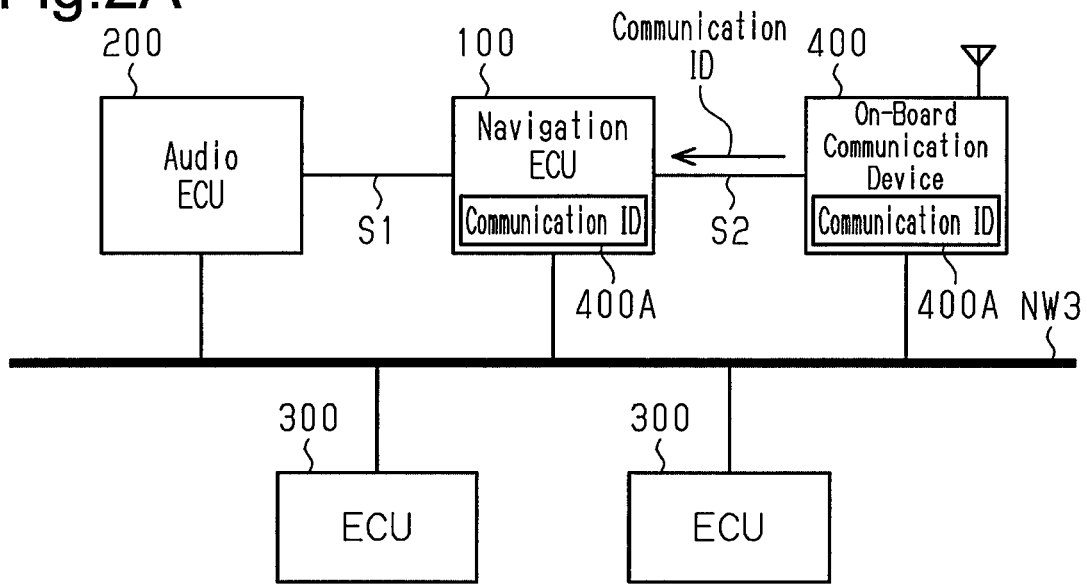
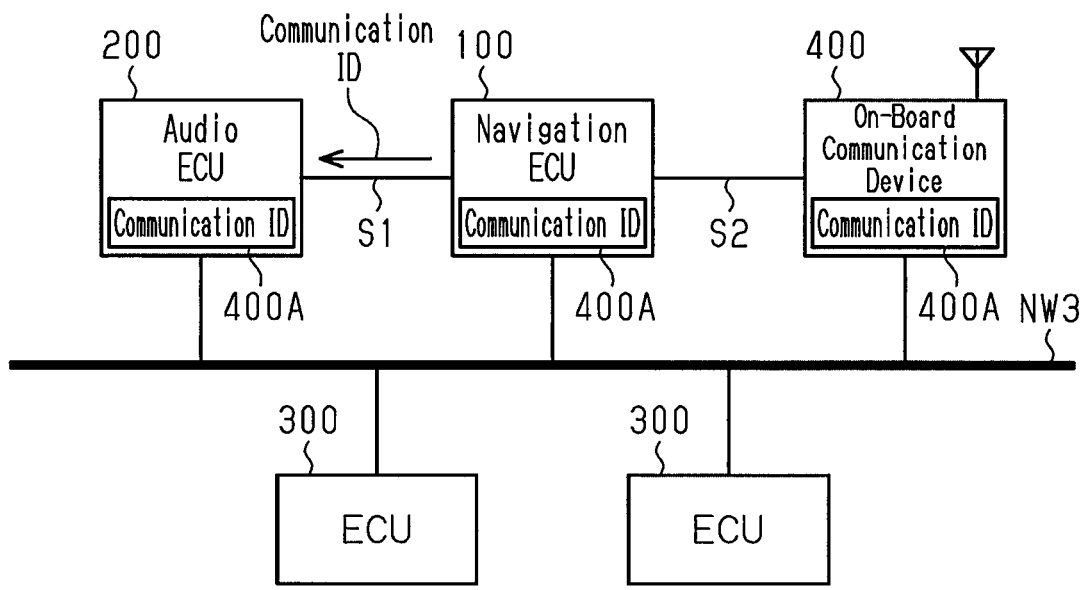

VEHICLE COMMUNICATION SYSTEM

CROSS-REFERENCE TO RELATED APPLICATION

The present application claims priority to Japanese Patent Application No. 2016-251968 filed Dec. 26, 2016, which is incorporated herein by reference in its entirety.

BACKGROUND ART

The present invention relates to a vehicle communication system that transmits vehicle information.

A known communication device transmits vehicle information relating to a vehicle from the vehicle to an information center. Such a communication device is, for example, a mobile terminal installed in a vehicle and uses a vehicle identification number that is added to the vehicle as information for identifying the vehicle (refer to, for example, U.S. Pat. No. 7,319,848).

The vehicle identification number added to the vehicle is assigned when the vehicle is manufactured and is not related to communication devices and on-board devices. Therefore, a vehicle that can perform communication using the vehicle identification number is limited to a vehicle provided with a communication device storing the vehicle identification number.

SUMMARY

It is an object of the present invention to provide a vehicle communication system that increases versatility for the communication of vehicle information.

To achieve the above object, a vehicle communication system includes a first on-board device installed in a vehicle and a first communication device configured to be connected to the first on-board device. Individual identification information used to identify the first communication device as an individual communication terminal is added to the first communication device. The first communication device is configured to transmit the individual identification information to the first on-board device. The first on-board device is configured to associate vehicle information of the vehicle with the individual identification information and transmit the vehicle information associated with the individual identification information to an information device via the first communication device.

To achieve the above object, a vehicle communication system includes a first on-board device installed in a vehicle, a first communication device configured to be connected to the first on-board device, and a second communication device configured to be connected to the first on-board device. Individual identification information used to identify the first communication device as an individual communication terminal is added to the first communication device. The first communication device is configured to transmit the individual identification information to the first on-board device. The first on-board device is configured to associate vehicle information of the vehicle with the individual identification information and transmit the vehicle information associated with the individual identification information to an information device via the second communication device.

BRIEF DESCRIPTION OF DRAWINGS

The invention, together with objects and advantages thereof, may best be understood by reference to the following description of the presently preferred embodiments together with the accompanying drawings in which:

FIGS. 2A and 2B are schematic diagrams illustrating a processing flow when a communication ID of an on-board communication device is shared with an ECU that uploads vehicle information;

DETAILED DESCRIPTION OF THE EMBODIMENTS

First Embodiment

A first embodiment of a vehicle communication system will now be described with reference to the drawings.

The vehicle communication system includes a plurality of ECUs (electronic control units), which serves as on-board devices, and an on-board communication device. Each of the plurality of ECUs transmits the vehicle information it manages from the on-board communication device to a center that manages vehicle information relating to a plurality of vehicles. The center serves as an information device. In this system, a communication ID unique to the on-board communication device is shared in advance among the ECUs that upload vehicle information. Further, each of these ECUs associates the communication ID with the vehicle information that it manages and uploads the vehicle information associated with the communication ID to the center via the on-board communication device. Upon receipt of the vehicle information from the on-board communication device, the center stores the received vehicle information in a vehicle information database. The center manages different kinds of vehicle information received from the plurality of ECUs separately for each vehicle using the communication ID associated with the vehicle information as a key. Each ECU or the on-board communication device may be configured as a circuitry that includes (1) one or more processors that are run by a computer program (software), (2) one or more dedicated hardware circuits such as ASIC, or (3) a combination of the above. Each of the processor includes a CPU and a memory such as a RAM and a ROM, and the memory stores program codes or instructions configured to execute processing with the CPU. The memory, or computer readable medium, includes any available media that is accessible by a versatile or dedicated computer.

Figure 1:
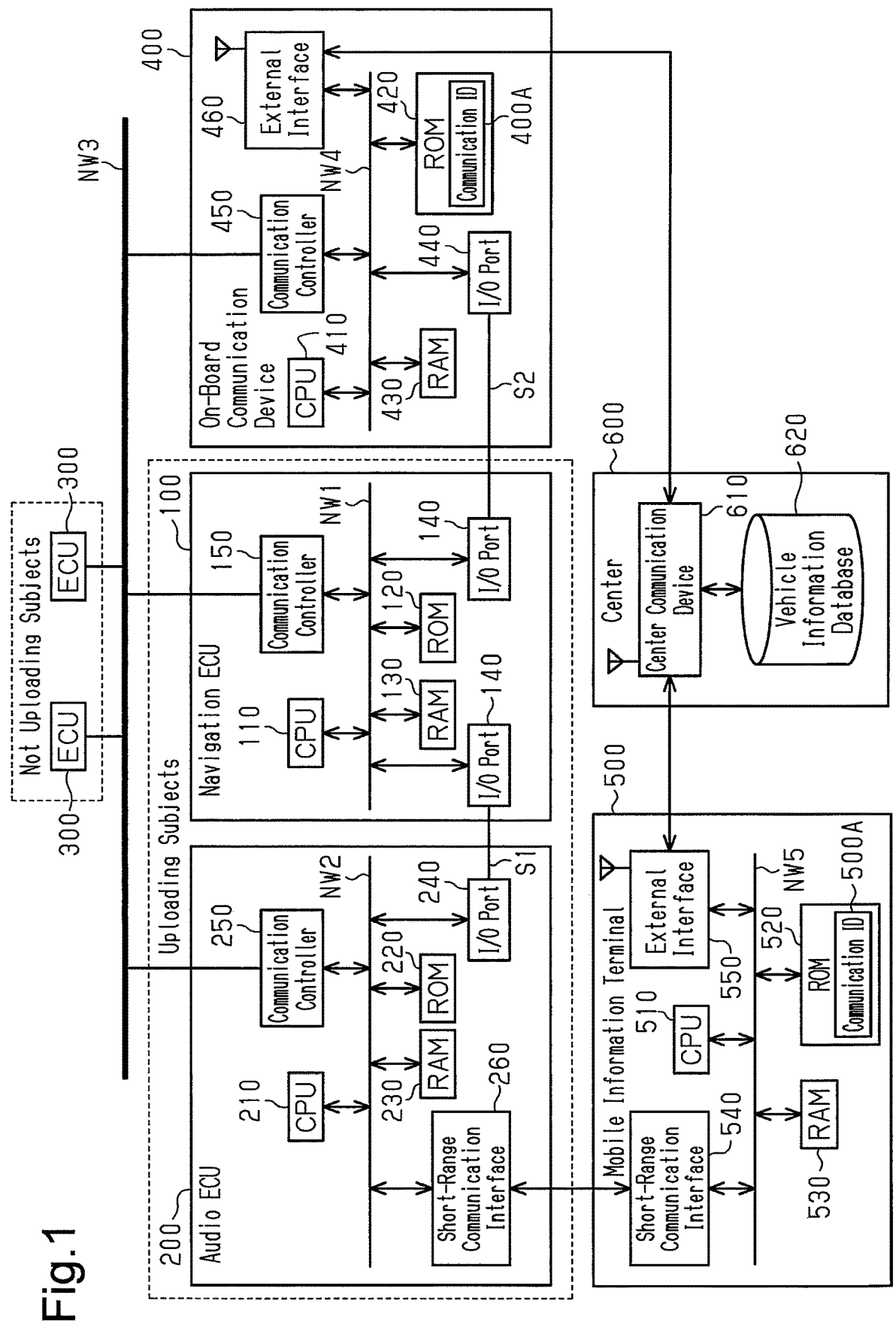
FIG. 1 is a schematic block diagram illustrating the configuration of a first embodiment of a vehicle communication system.

Specifically, as illustrated in FIG. 1, examples of the ECUs that upload vehicle information include a navigation ECU 100 and an audio ECU 200. The navigation ECU 100 is an ECU that controls a car navigation system and performs route guidance from the current location to a destination or the like. The audio ECU 200 is an ECU that controls an audio system for playing music in the passenger compartment.

The navigation ECU 100 includes, for example, a CPU 110 (central processing unit), a ROM 120 (read-only memory), a RAM 130 (random access memory), an I/O port 140 (input-output port), and a communication controller 150, all of which are connected to each other via a communication bus NW1.

The audio ECU 200 includes, for example, a CPU 210, a ROM 220, a RAM 230, an I/O port 240, and a communication controller 250 that are connected to one another by a communication bus NW2.

The communication controller 150 of the navigation ECU 100 and the communication controller 250 of the audio ECU 200 are connected to a vehicle network NW3. Specifically, in addition to the navigation ECU 100 and the audio ECU 200 that upload vehicle information, the plurality of ECUs include ECUs 300 that do not upload vehicle information and are connected to each other via the vehicle network NW3. Further, the ECUs 100, 200, and 300 transmit and receive various sensor data and vehicle information such as control data through the vehicle network NW3. In this embodiment, the vehicle network NW3 transmits and receives vehicle information in accordance with a communications protocol specified by a CAN (controller area network).

The navigation ECU 100 and the audio ECU 200 are connected to an on-board communication device 400 via the vehicle network NW3. The on-board communication device 400 includes, for example, a CPU 410, a ROM 420, a RAM 430, an I/O port 440, a communication controller 450, and an external interface 460 that communicates with the outside of the vehicle, all of which are connected to one another by a communication bus NW4. The external interface 460 uses a communication ID 400A stored in the ROM 420 to establish communication with the outside of the vehicle. In this case, an ID such as International Mobile Equipment Identity (IMEI), used to identify the on-board communication device 400 in a network may be used as the communication ID 400A. Alternatively, the communication ID 400A may be a number assigned to each user by the operator of an information server. For example, when an on-board communication device is set to access the server of a certain corporation, the ID may be assigned to the on-board communication device by the server of the corporation. The IMEI is a communication ID unique to the on-board communication device 400 and is fixed regardless of changes in a network environment established between the on-board communication device 400 and the outside of the vehicle.

A communication line S1, which is a dedicated communication line that connects the navigation ECU 100 and the audio ECU 200 separately from other devices, is provided between the I/O port 140 of the navigation ECU 100 and the I/O port 240 of the audio ECU 200 as a communication path that differs from the vehicle network NW3. In the same manner, a communication line S2, which is a dedicated communication line that connects the navigation ECU 100 and the on-board communication device 400 separately from other devices, is provided between the I/O port 140 of the navigation ECU 100 and the I/O port 440 of the on-board communication device 400 as a communication path that differs from the vehicle network NW3. The communication lines S1 and S2 may each be, for example, a USB communication cable, a PCI-E bus, or a serial connection line. The communication speed of each of the communication lines S1 and S2 that connect the two on-board devices separately from other units tends to be higher than the communication speed of the vehicle network NW3 that connects three or more on-board devices with each other. Further, the communication lines S1 and S2 can ensure confidentiality of information against unauthorized access more easily than the vehicle network NW3.

Therefore, in this embodiment, when the vehicle is shipped out of the factory, the on-board communication device 400 shares the communication ID 400A with the navigation ECU 100 and the audio ECU 200 via the communication lines S1 and S2 in response to a request from the navigation ECU 100 in a state in which connection is established between the navigation ECU 100 and the audio ECU 200 via the vehicle network NW3 and the communication lines S1 and S2.

More specifically, as illustrated in FIG. 2A, in a state in which the on-board communication device 400 is connected to the navigation ECU 100 via the communication line S2, the on-board communication device 400 transmits the communication ID 400A it manages to the navigation ECU 100 via the communication line S2 in response to a request from the navigation ECU 100. Then, after obtaining the communication ID 400A from the on-board communication device 400 via the communication line S2, the navigation ECU 100 stores the obtained communication ID 400A in the ROM 120 of the navigation ECU 100. At this time, the communication ID 400A is shared with the on-board communication device 400 and the navigation ECU 100 via the communication line S2, while the confidentiality of the communication ID 400A is ensured.

Further, as illustrated in FIG. 2B, at the point of time when detecting connection with the audio ECU 200 via the communication line S1, the navigation ECU 100 reads the communication ID 400A obtained from the on-board communication device 400 from the ROM 120 and transmits the read communication ID 400A to the audio ECU 200 via the communication line S1. Then, after obtaining the communication ID 400A from the navigation ECU 100 via the communication line S1, the audio ECU 200 stores the obtained communication ID 400A in its ROM 220. The communication ID 400A is shared with the navigation ECU 100 and the audio ECU 200 via the communication line S1 while the confidentiality of the communication ID 400A is ensured.

Then, the navigation ECU 100 uploads the vehicle information that it manages, such as position information of the vehicle and setting information of the destination, to a center 600 located outside the vehicle through the on-board communication device 400. More specifically, the navigation ECU 100 uploads the vehicle information to a center communication device 610 of the center 600.

Figure 3:
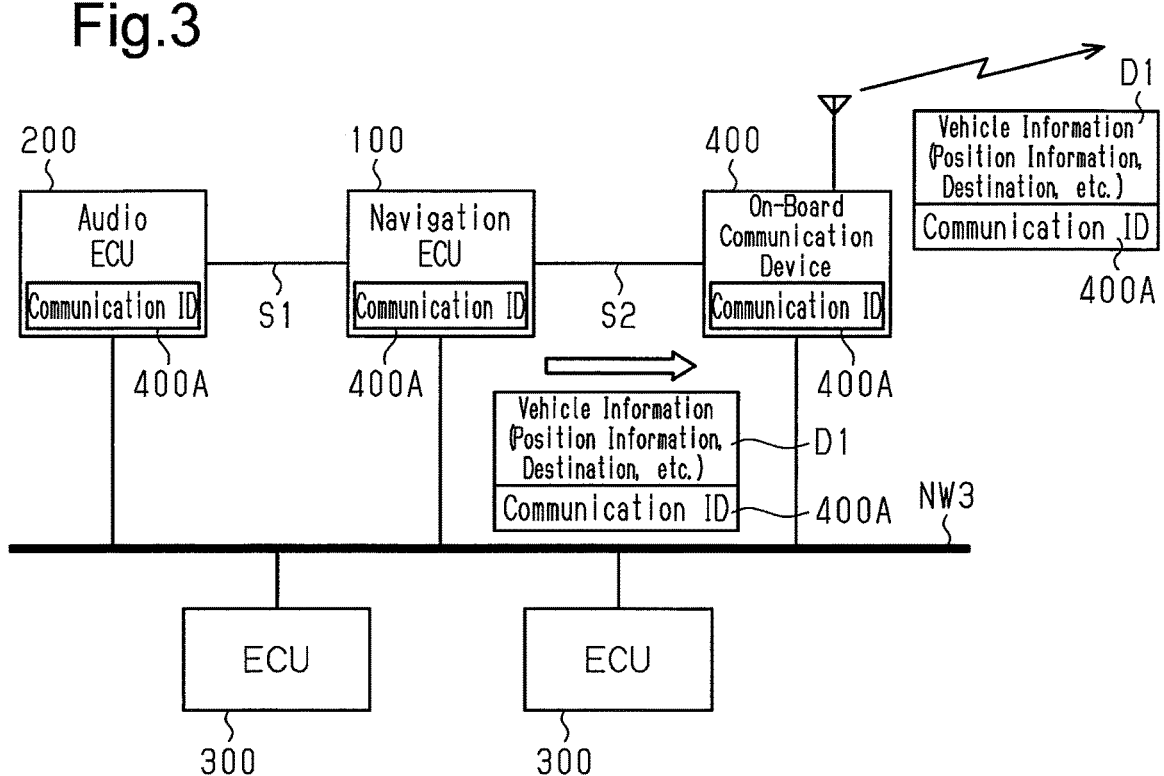
FIG. 3 is a schematic diagram illustrating a processing flow when the vehicle information is uploaded from a navigation ECU to a center.

In detail, as illustrated in FIG. 3, the navigation ECU 100 first transmits the vehicle information which it manages to the on-board communication device 400 via the communication line S2. As described above, the navigation ECU 100 reads the communication ID 400A, which is shared with the on-board communication device 400, from the ROM 120 and associates the read communication ID 400A with vehicle information D1 that is transmitted.

Then, when obtaining the vehicle information D1 from the navigation ECU 100 via the communication line S2, the on-board communication device 400 uploads the obtained vehicle information D1 to the center 600. Specifically, the on-board communication device 400 obtains the vehicle information D1 associated with the communication ID 400A from the navigation ECU 100 and then uploads the vehicle information D1 associated with the communication ID 400A to the center 600.

Further, as illustrated in FIG. 1, the audio ECU 200 includes the CPU 210, the ROM 220, the RAM 230, the I/O port 240, the communication controller 250, and a short-range communication interface 260 that are connected to one another via the communication bus NW2. The short-range communication interface 260 carries out short-range communication such as Bluetooth (registered trademark) with a mobile information terminal 500 located in the passenger compartment. Further, in this embodiment, the short-range communication interface 260 transmits the vehicle information it manages, such as operating information of an audio system, to the mobile information terminal 500 with which short-range communication is established.

The mobile information terminal 500 includes a short-range communication interface 540, which carries out short-range communication with the short-range communication interface 260 of the audio ECU 200, and an external interface 550, which carries out communication with the outside of the vehicle. The mobile information terminal 500 further includes a CPU 510, a ROM 520, and a RAM 530. The short-range communication interface 540, the external interface 550, the CPU 510, the ROM 520, and the RAM 530 are connected with one another via a communication bus NW5. The short-range communication interface 540 obtains the vehicle information managed by the audio ECU 200 through short-range communication with the short-range communication interface 260 of the audio ECU 200. The external interface 550 uses a communication ID 500A stored in the ROM 520 to establish communication with the center 600 outside the vehicle. In this case, in the same manner as the communication ID 400A, the communication ID 500A is an ID such as an IMEI used to identify the mobile information terminal 500 in a network. Further, when communication is established with the center 600, the external interface 550 uploads the vehicle information obtained from the audio ECU 200 through short-range communication to the center 600. More specifically, the external interface 550 uploads the vehicle information to the center communication device 610 of the center 600.

Figure 4:
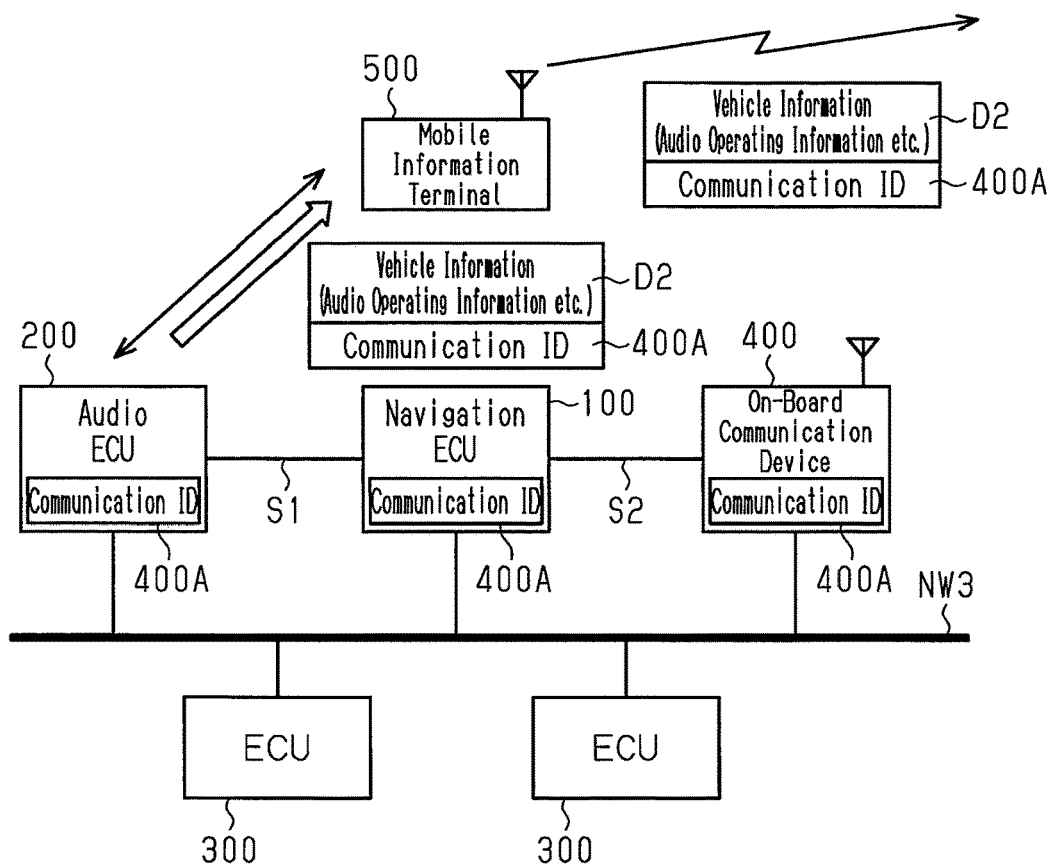
FIG. 4 is a schematic diagram illustrating a processing flow when the vehicle information is uploaded from an audio ECU to the center.

As illustrated in FIG. 4, the audio ECU 200 first transmits vehicle information D2 that it manages to the mobile information terminal 500 through short-range communication. At this time, as described above, the audio ECU 200 reads the communication ID 400A shared with the on-board communication device 400 from the ROM 220 and associates the read communication ID 400A with the vehicle information D2 that is transmitted.

Then, when obtaining the vehicle information D2 from the audio ECU 200 through short-range communication, the mobile information terminal 500 uploads the obtained vehicle information D2 to the center 600. Specifically, the mobile information terminal 500 obtains the vehicle information D2 associated with the communication ID 400A from the audio ECU 200 and uploads the vehicle information D2 associated with the communication ID 400A to the center 600.

Then, as illustrated in FIG. 3, when the center 600 obtains the vehicle information D1 from the navigation ECU 100 with the center communication device 610 via the on-board communication device 400, the center 600 stores the vehicle information D1 in a vehicle information database 620 (refer to FIG. 1) separately for each vehicle using the communication ID 400A associated with the obtained vehicle information D1 as a key. Further, as illustrated in FIG. 4, when the center 600 obtains the vehicle information D2 from the audio ECU 200 with the center communication device 610 via the mobile information terminal 500, the center 600 stores the vehicle information D2 in the vehicle information database 620 separately for each vehicle using the communication ID 400A associated with the obtained vehicle information D2 as a key.

Figure 5:
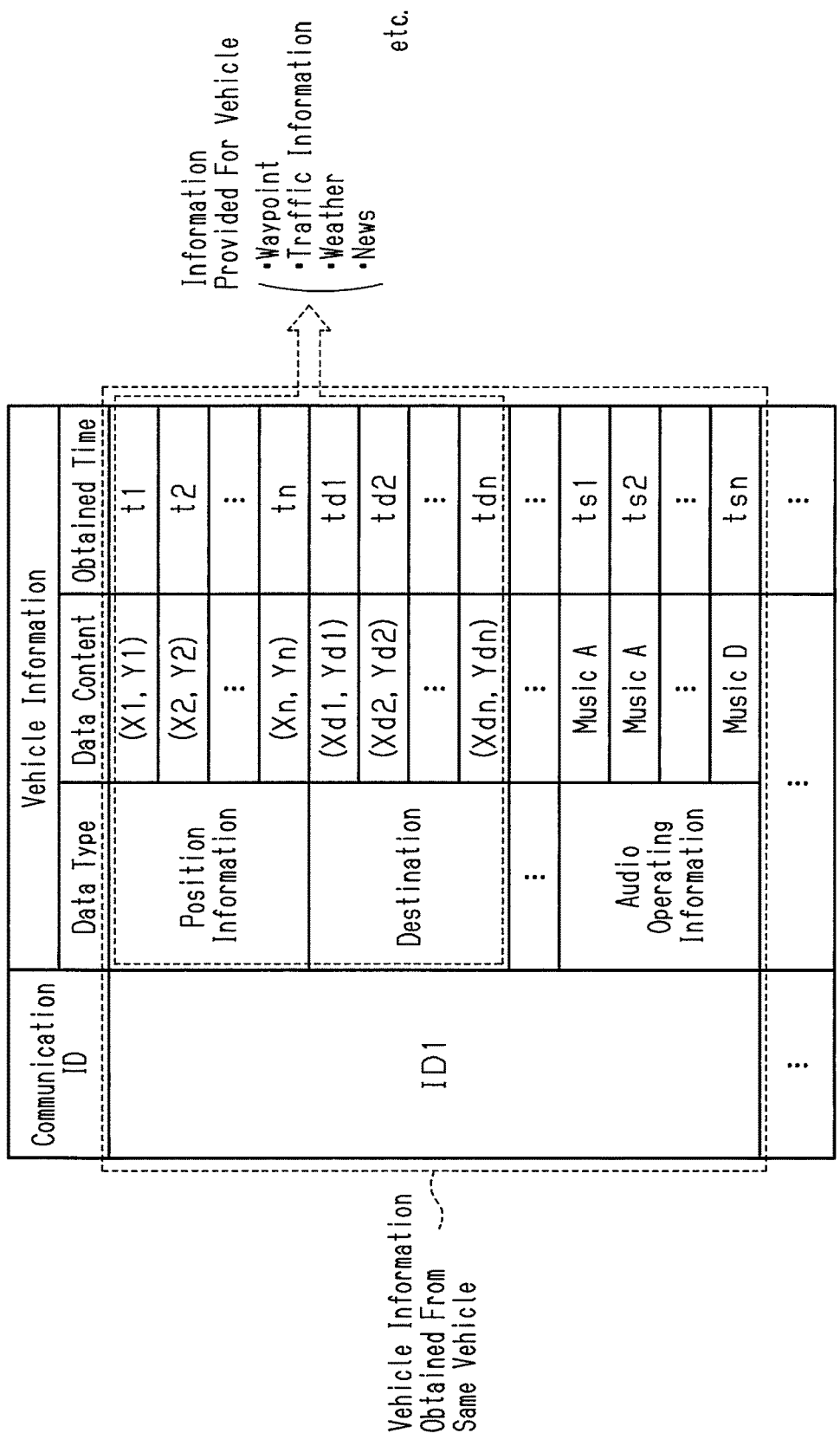
FIG. 5 is a diagram illustrating one example of a data content stored in a vehicle information database.

FIG. 5 illustrates one example of the data contents of the vehicle information managed by the vehicle information database 620. In the example illustrated in FIG. 5, the vehicle information database 620 includes "position information," "destination," and "audio operating information" that are data types of the vehicle information obtained from a predetermined vehicle. Such data is managed together with contents of the data and the obtained time. In the vehicle information, the "position information" and the "destination" are information obtained from the navigation ECU 100 via the on-board communication device 400, and the "audio operating information" is information obtained from the audio ECU 200 via the mobile information terminal 500. Further, such vehicle information is associated with a common communication ID "ID1," which indicates that the vehicle information is obtained from the same vehicle. As described above, the vehicle information database 620 manages the vehicle information obtained from the ECUs 100 and 200 through different communication paths in an centralized manner using the common communication ID 400A as a key.

Further, based on the vehicle information managed by the vehicle information database 620 in this manner, the center 600 provides information suitable for the vehicle that transmitted the vehicle information. In the example illustrated in FIG. 5, based on the vehicle information related to the "position information" and the "destination" obtained from the navigation ECU 100, the center 600 provides the vehicle that transmitted the vehicle information with suitable information such as waypoints that the vehicle will pass by before arriving at the destination, traffic information and weather information for the route from a starting point to the destination for the vehicle, and news related to the locations along the traveling route. For each type of information, the center 600 designates the ECU provided with the information before the center communication device 610 transmits the information to the on-board communication device 400 or the mobile information terminal 500. Instead, regardless of the type of the provided information, the on-board communication device 400 or the mobile information terminal 500 may designate the ECU provided with the information in accordance with the type of information received from the center 600 without the center 600 without specifying the ECU provided with the information.

The actions of the vehicle communication system according to the present embodiment will now be described focusing on the actions when vehicle information is transmitted to the center 600 from the navigation ECU 100 and the audio ECU 200 through different communication paths.

Figure 6:
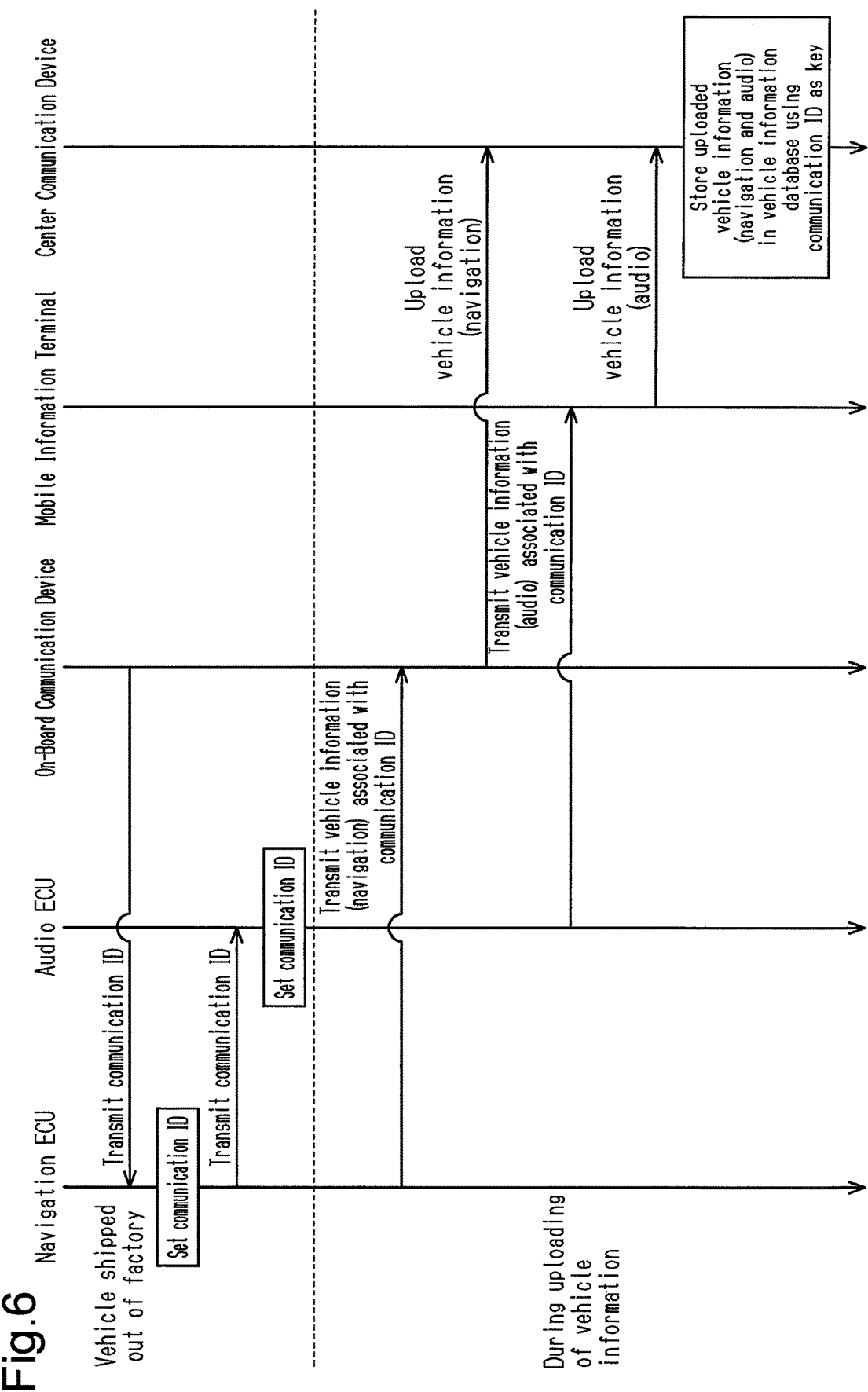
FIG. 6 is a sequence chart illustrating the flow of information when the vehicle communication system of FIG. 1 uploads the vehicle information to the center.

As illustrated in FIG. 6, when the vehicle is shipped out of the factory, in response to a request from the navigation ECU 100 in state in which the navigation ECU 100 and the audio ECU 200 are connected via the vehicle network NW3 and the communication lines S1 and S2, the on-board communication device 400 transmits the communication ID 400A that it manages to the navigation ECU 100 via the communication line S2.

When obtaining the communication ID 400A from the on-board communication device 400, the navigation ECU 100 sets the obtained communication ID 400A as data used when transmitting the vehicle information D1 it manages. Further, the navigation ECU 100 transmits the communication ID 400A obtained from the on-board communication device 400 to the audio ECU 200 via the communication line S1. In other words, the on-board communication device 400 transmits the communication ID 400A to the audio ECU 200 through the navigation ECU 100.

When obtaining the communication ID 400A from the navigation ECU 100, the audio ECU 200 sets the obtained communication ID 400A as data used when transmitting the vehicle information D2 that it manages.

Thereafter, the navigation ECU 100 associates the communication ID 400A, which has been set in advance, with the vehicle information D1 that it manages and transmits the vehicle information D1, which is associated with the communication ID 400A, to the on-board communication device 400. Then, when receiving the vehicle information D1 from the navigation ECU 100, the on-board communication device 400 uploads the vehicle information D1 associated with the communication ID 400A to the center communication device 610.

In the same manner, the audio ECU 200 associates the communication ID 400A, which has been set in advance, with the vehicle information D2 that it manages and transmits the vehicle information D2, which is associated with the communication ID 400A, to the mobile information terminal 500. Then, when receiving the vehicle information D2 from the audio ECU 200, the mobile information terminal 500 uploads the vehicle information D2 associated with the communication ID 400A to the center communication device 610.

Then, when receiving the vehicle information D1 uploaded from the navigation ECU 100 via the on-board communication device 400 and the vehicle information D2 uploaded from the audio ECU 200 via the mobile information terminal 500, the center communication device 610 stores the received vehicle information D1 and D2 in the vehicle information database 620 using the communication ID 400A as a key.

The operation of the vehicle communication system according to this embodiment will now be described.

When an ECU installed in the vehicle uploads the vehicle information it manages to the center that is located outside the vehicle, an ID of the transmission source ECU is usually assigned to the vehicle information that is uploaded. Thus, the ID assigned to the vehicle information differs between the transmission source ECUs.

Thus, in order for the center to manage the vehicle information uploaded from the ECUs for separately for each vehicle, the vehicle information can be uploaded to the center associated with a vehicle identification number (VIN) that identifies the vehicle based on manufacturer, model, or manufactured year of the vehicle.

However, such a vehicle identification number is data that is non-essential to the on-board communication device 400. Therefore, in order to share such a vehicle identification number with the ECUs 100 and 200 that are connected to the on-board communication device 400 via the communication lines S1 and S2, the vehicle identification number needs to be written to the on-board communication device 400 by an ECU that manages the vehicle identification number. The ECU that manages the vehicle identification number may differ between vehicle models. Therefore, when the vehicle identification number is written, the ECU that manages the vehicle identification number also needs to be specified when the vehicle is shipped out of the factory. Thus, there is room for improvement with regard to convenience for manufacturing vehicles.

In this respect, in the present embodiment, among the ECUs that are installed in the vehicle, the ECUs 100 and 200 that upload the vehicle information share the communication ID 400A, which is an ID unique to the on-board communication device 400, with the on-board communication device 400 through the communication lines S1 and S2 when the vehicle is shipped out of the factory.

Here, the communication ID 400A is an ID used to identify the on-board communication device 400 in the network when the on-board communication device 400 establishes communication with the outside of the vehicle. Further, the communication ID 400A is data that is essential for the on-board communication device 400. Therefore, there is no need to write the communication ID 400A in advance to the on-board communication device 400 from a different ECU, and the communication ID 400A improves the convenience during manufacturing as compared to the vehicle identification number described above. Further, the communication ID 400A is an IMEI, for example, which is assigned as a number unique to all communication devices. Therefore, any vehicle including the on-board communication device 400 can perform communication using the communication ID 400A. This increases the versatility of communication using the vehicle information D1 and D2.

Further, when the vehicle information D1 and D2 is obtained from the ECUs 100 and 200 that are installed in the vehicle, the center 600 stores the vehicle information D1 and D2 in the vehicle information database 620 separately for each vehicle by using the communication ID 400A associated with the obtained vehicle information D1 and D2 as a key. This allows the center 600 to manage the vehicle information D1 and D2 obtained from the ECUs 100 and 200 separately for each vehicle.

The communication ID 400A associated with the vehicle information D1 and D2 is an ID shared in advance with the ECUs 100 and 200, which are the transmission sources of the vehicle information D1 and D2. Further, the communication ID 400A is not associated with the vehicle information D1 and D2 when the on-board communication device 400 or the mobile information terminal 500 arbitrates the vehicle information D1 and D2. The communication ID 400A is associated with the vehicle information D1 and D2 when the ECUs 100 and 200, which are the transmission sources of the vehicle information D1 and D2, transmit the vehicle information D1 and D2. Therefore, even if the vehicle information D1 and D2 is uploaded to the center 600 through different communication paths from the ECUs 100 and 200, the vehicle information D1 and D2 is associated with the common communication ID 400A. This allows the center 600 to manage the vehicle information D1 and D2 separately for each vehicle regardless of the communication paths of the vehicle information D1 and D2 from the vehicle.

The first embodiment has the advantages described below.

(1) The vehicle information D1 and D2 is uploaded to the center 600 together with the communication ID 400A that is the individual identification information added to the on-board communication device 400. Here, the communication ID 400A is an IMEI, for example, which is a unique number and assigned to all communication devices. This allows any vehicle including the on-board communication device 400 to perform communication using the communication ID 400A and improves versatility of communication using the vehicle information D1 and D2.

(2) The vehicle information D1 and D2 is information, for example, relating to the traveling situation and environment of the vehicle. The frequency of transmission of the vehicle information D1 and D2, the amount of information of the vehicle information D1 and D2, and the communication environment of the vehicle information D1 and D2 differ between the vehicle information D1 and D2. In the vehicle communication system described above, it is desirable that the vehicle include communication devices that transmit the vehicle information D1 and D2 separately. The on-board communication device 400 and the mobile information terminal 500 include different individual identification numbers. However, the communication ID 400A, which is the individual identification number added to the on-board communication device 400, is shared for communication by the on-board communication device 400 and communication by the mobile information terminal 500. Therefore, the vehicle information D1 and D2 transmitted from the on-board communication device 400 and the mobile information terminal 500 can be managed by the center 600 as information relating to the same vehicle.

(3) The communication ID 400A, which is the individual identification number added to the on-board communication device 400, is information for specifying the vehicle including the vehicle communication system and highly confidential. The transmission of the communication ID 400A is performed through the communication lines S1 and S2 that connect the ECUs 100 and 200 separately from other devices. This improves confidentiality of the communication ID 400A.

(4) The on-board communication device 400 transmits the vehicle information D1, which is associated with the communication ID 400A and obtained from the navigation ECU 100, to the center 600, and the mobile information terminal 500 transmits the vehicle information D2, which is associated with the communication ID 400A and obtained from the audio ECU 200, to the center 600. Therefore, the vehicle information D1 transmitted from the on-board communication device 400 and the vehicle information D2 transmitted from the mobile information terminal 500 can be managed by the center 600 as information related to the same vehicle.

Second Embodiment

A second embodiment of the vehicle communication system will now be described with reference to the drawings. The second embodiment differs from the first embodiment in that the second embodiment is applied to a vehicle that does not include the on-board communication device. Same reference numerals are given to those components that are the same as the corresponding components of the first embodiment. Such components will not be described in detail. The description hereafter will focus on differences from the first embodiment.

Figure 7:
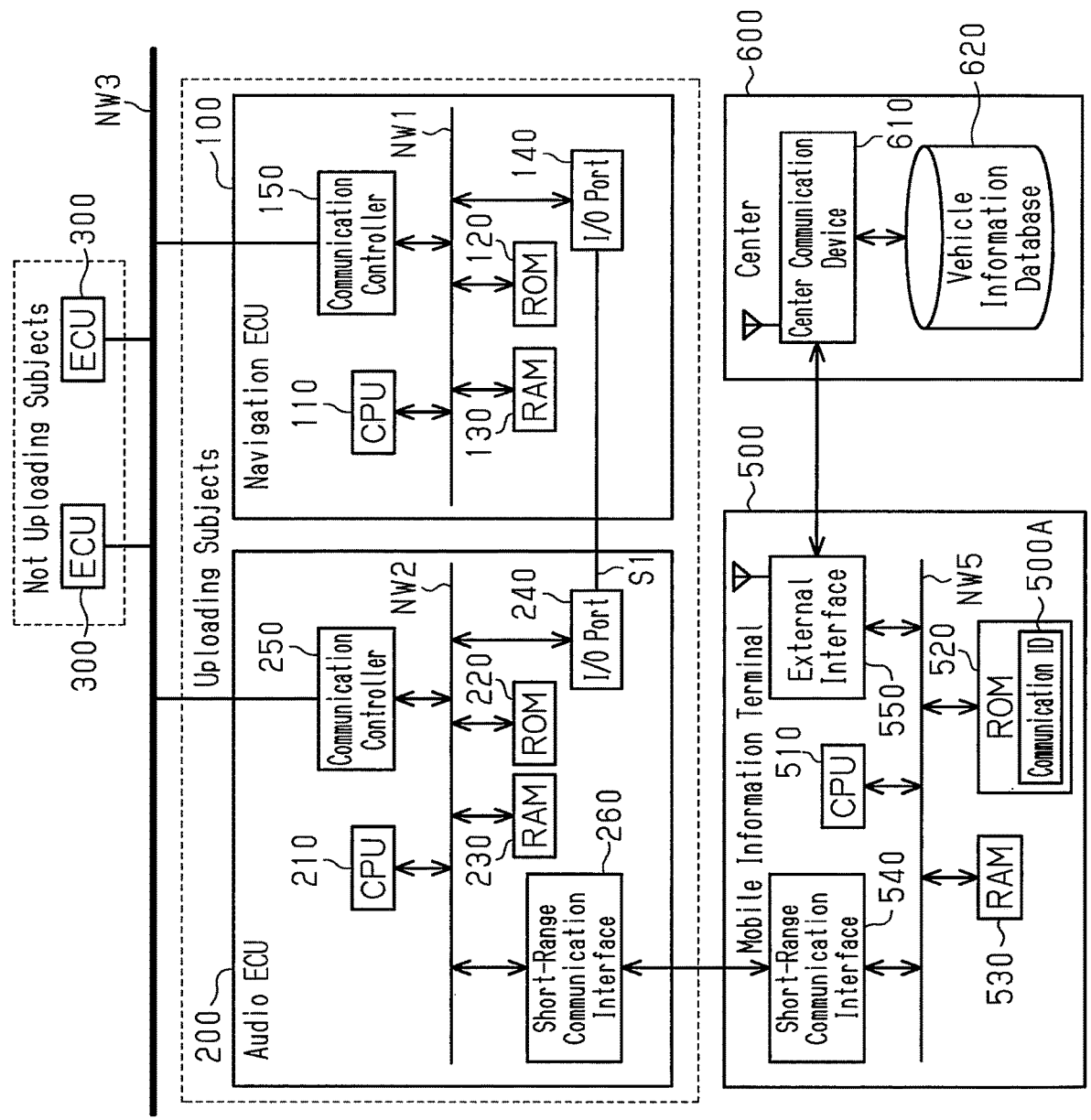
FIG. 7 is a schematic block diagram illustrating the configuration of a second embodiment of the vehicle communication system.

As illustrated in FIG. 7, in the same manner as the first embodiment, in the second embodiment, the communication line S1 is connected between the I/O port 140 of the navigation ECU 100 and the I/O port 240 of the audio ECU 200. Further, the audio ECU 200 includes the short-range communication interface 260 which carries out short-range communication such as Bluetooth (registered trademark) with the mobile information terminal 500 in the passenger compartment. Further, the mobile information terminal 500 includes the external interface 550 which uses the communication ID 500A stored in the ROM 520 to establish communication with the center 600 located outside the vehicle. In this case, the communication ID 500A is an ID used to identify the mobile information terminal 500 in a network.

In the second embodiment, when short-range communication is established for the first time with the audio ECU 200, the mobile information terminal 500 shares the communication ID 500A with the navigation ECU 100 and the audio ECU 200 through short-range communication and via the communication line S1.

Figure 8A:
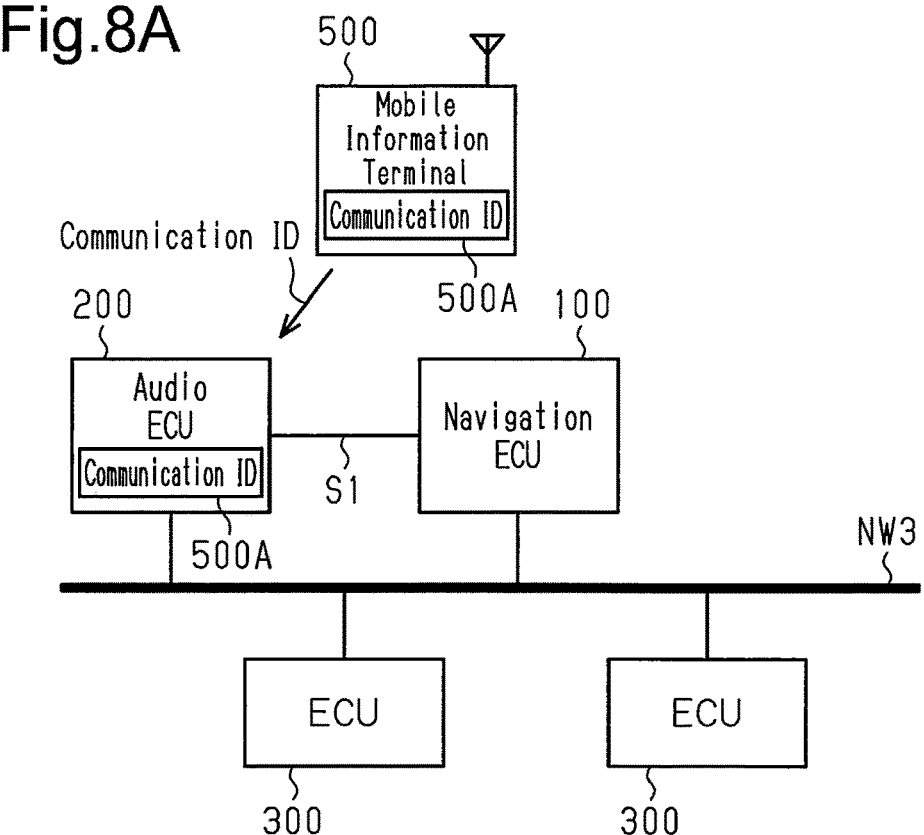
FIGS. 8A and 8B are schematic diagrams illustrating a processing flow when a communication ID of a mobile information terminal is shared with an ECU that uploads vehicle information.

More specifically, as illustrated in FIG. 8A, when connection through short-range communication with the mobile information terminal 500 is first detected, the audio ECU 200 requests the mobile information terminal 500 to transmit the communication ID 500A. At this time, the audio ECU 200 logs and records the detection result of the connection through short-range communication with the mobile information terminal 500. If the mobile information terminal 500 currently connected to the audio ECU 200 has been connected through short-range communication in the past or if the audio ECU 200 has been connected in the past through short-range communication to a mobile information terminal 500 other than the currently connected mobile information terminal 500, the audio ECU 200 does not request the currently connected mobile information terminal 500 to transmit the communication ID 500A. On the other hand, if the mobile information terminal 500 currently connected to the audio ECU 200 has not been connected through short-range communication in the past and the audio ECU 200 has not been connected in the past through short-range communication to a mobile information terminal 500 other than the currently connected mobile information terminal 500, the audio ECU 200 requests the currently connected mobile information terminal 500 to transmit the communication ID 500A.

Further, in response to the request from the audio ECU 200, the mobile information terminal 500 transmits the communication ID 500A that is manages to the audio ECU 200 through the short-range communication. Then, when obtaining the communication ID 500A from the mobile information terminal 500 through the short-range communication, the audio ECU 200 stores the obtained communication ID 500A in the ROM 220 of the audio ECU 200. Thus, the communication ID 500A is shared by the mobile information terminal 500 and the audio ECU 200 through the short-range communication.

Figure 8B:
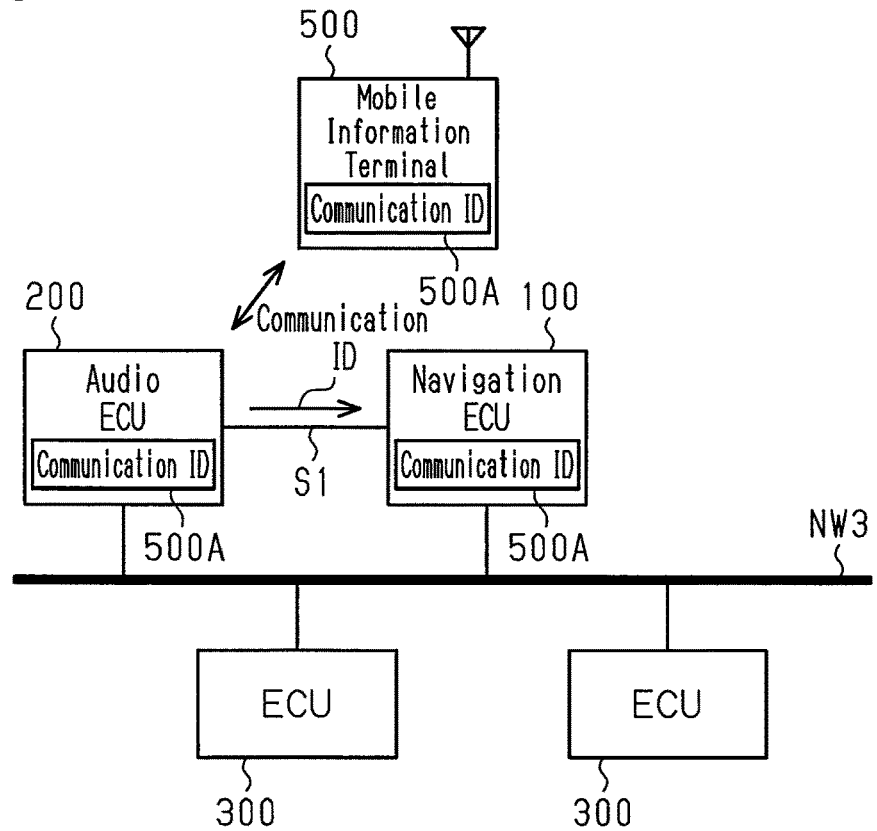

Further, as illustrated in FIG. 8B, at the point of time when connection with the navigation ECU 100 via the communication line S1 is detected, the audio ECU 200 reads the communication ID 500A obtained from the mobile information terminal 500 from the ROM 220. Then, the audio ECU 200 transmits the read communication ID 500A to the navigation ECU 100 via the communication line S1. Then, when obtaining the communication ID 500A from the audio ECU 200 via the communication line S1, the navigation ECU 100 stores the obtained communication ID 500A in the ROM 220 of the navigation ECU 100. Thus, the communication ID 500A is shared by the navigation ECU 100 and the audio ECU 200 via the communication line S1.

Then, the navigation ECU 100 uploads the vehicle information D1 that it manages, such as position information of the vehicle and setting information of the destination, to the center 600, which is located outside the vehicle, through the mobile information terminal 500.

Figure 9:
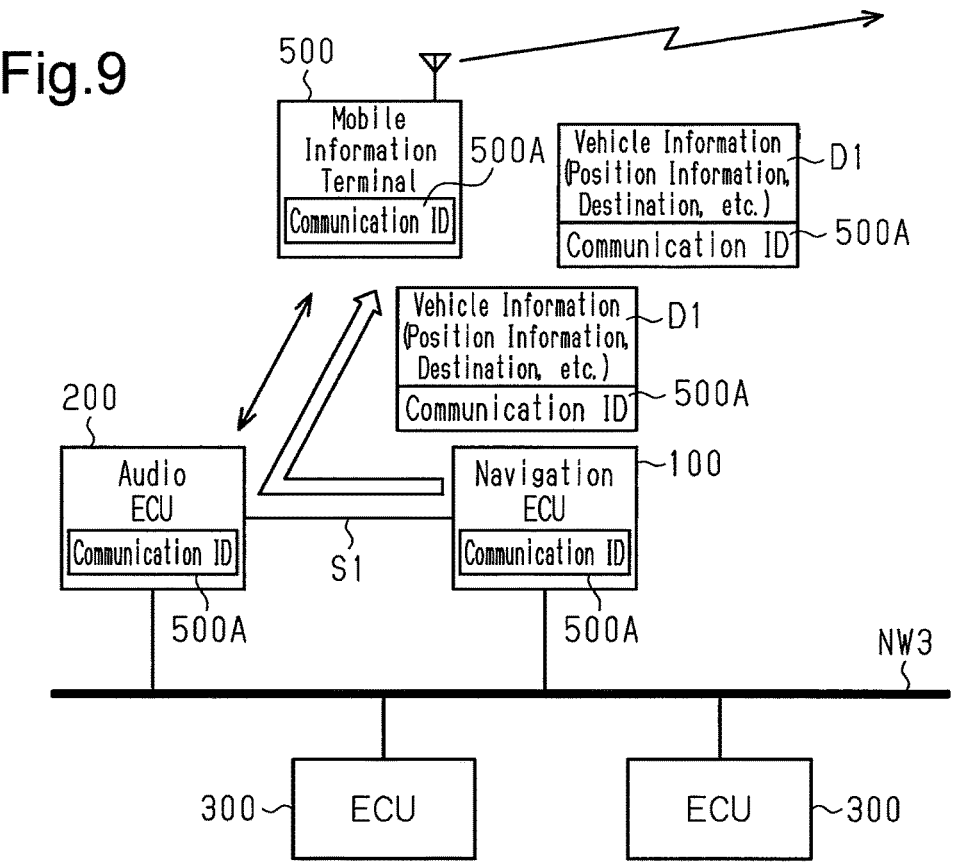
FIG. 9 is a schematic diagram illustrating a processing flow when the vehicle information is uploaded from a navigation ECU to a center.

More specifically, as illustrated in FIG. 9, the navigation ECU 100 first transmits the vehicle information D1 that is manages to the audio ECU 200 via the communication line S1. At this time, as described above, the navigation ECU 100 reads the communication ID 500A, which is shared with the mobile information terminal 500, from the ROM 120. Then, the navigation ECU 100 associates the read communication ID 500A with the vehicle information D1 that is transmitted.

Further, when obtaining the vehicle information D1 from the navigation ECU 100 via the communication line S1, the audio ECU 200 transmits the obtained vehicle information D1 to the mobile information terminal 500 through short-range communication. Specifically, the audio ECU 200 obtains the vehicle information D1 associated with the communication ID 500A from the navigation ECU 100. Then, the audio ECU 200 transmits the vehicle information D1 associated with the communication ID 500A to the mobile information terminal 500.

Then, when obtaining the vehicle information D1 from the audio ECU 200 through short-range communication, the mobile information terminal 500 uploads the obtained vehicle information D1 to the center 600. Specifically, the mobile information terminal 500 obtains the vehicle information D1 associated with the communication ID 500A from the audio ECU 200. Then, the mobile information terminal 500 uploads the vehicle information D1 associated with the communication ID 500A to the center 600.

In the same manner, the audio ECU 200 uploads the vehicle information D2 that it manages, such as operating information of the audio system, to the center 600 located outside the vehicle via the mobile information terminal 500.

Figure 10:
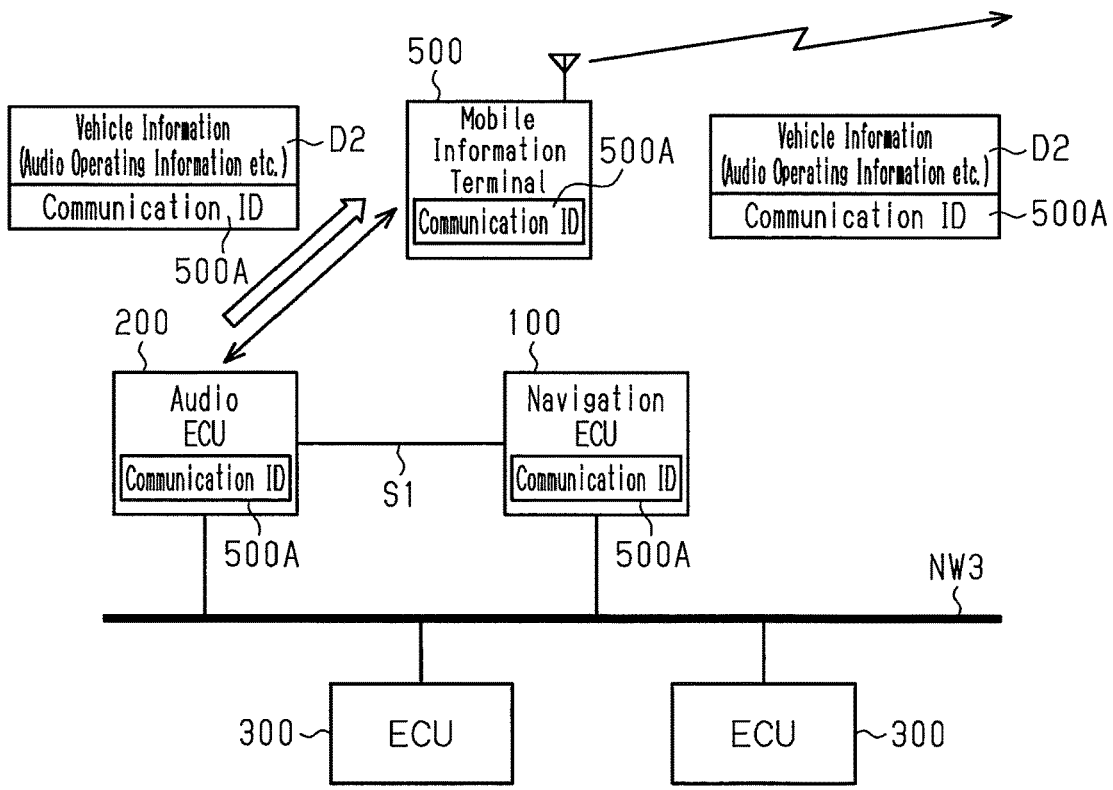
FIG. 10 is a schematic diagram illustrating a processing flow when the vehicle information is uploaded from an audio ECU to the center.

More specifically, as illustrated in FIG. 10, the audio ECU 200 first transmits the vehicle information D2 that it manages to the mobile information terminal 500 through short-range communication. At this time, as described above, the audio ECU 200 reads the communication ID 500A shared with the on-board communication device 400 from the ROM 220. Then, the audio ECU 200 associates the read communication ID 500A with the vehicle information D2 that is transmitted.

When obtaining the vehicle information D2 from the audio ECU 200 through the short-range communication, the mobile information terminal 500 uploads the obtained vehicle information D2 to the center 600. Specifically, the mobile information terminal 500 obtains the vehicle information D2 associated with the communication ID 500A from the audio ECU 200. Then, the mobile information terminal 500 uploads the vehicle information D2, which is associated with the communication ID 500A, to the center 600.

The actions of the vehicle communication system according to the second embodiment will now be described focusing on the actions when the vehicle information is transmitted to the center 600 from the navigation ECU 100 and the audio ECU 200 through a common communication path.

Figure 11:
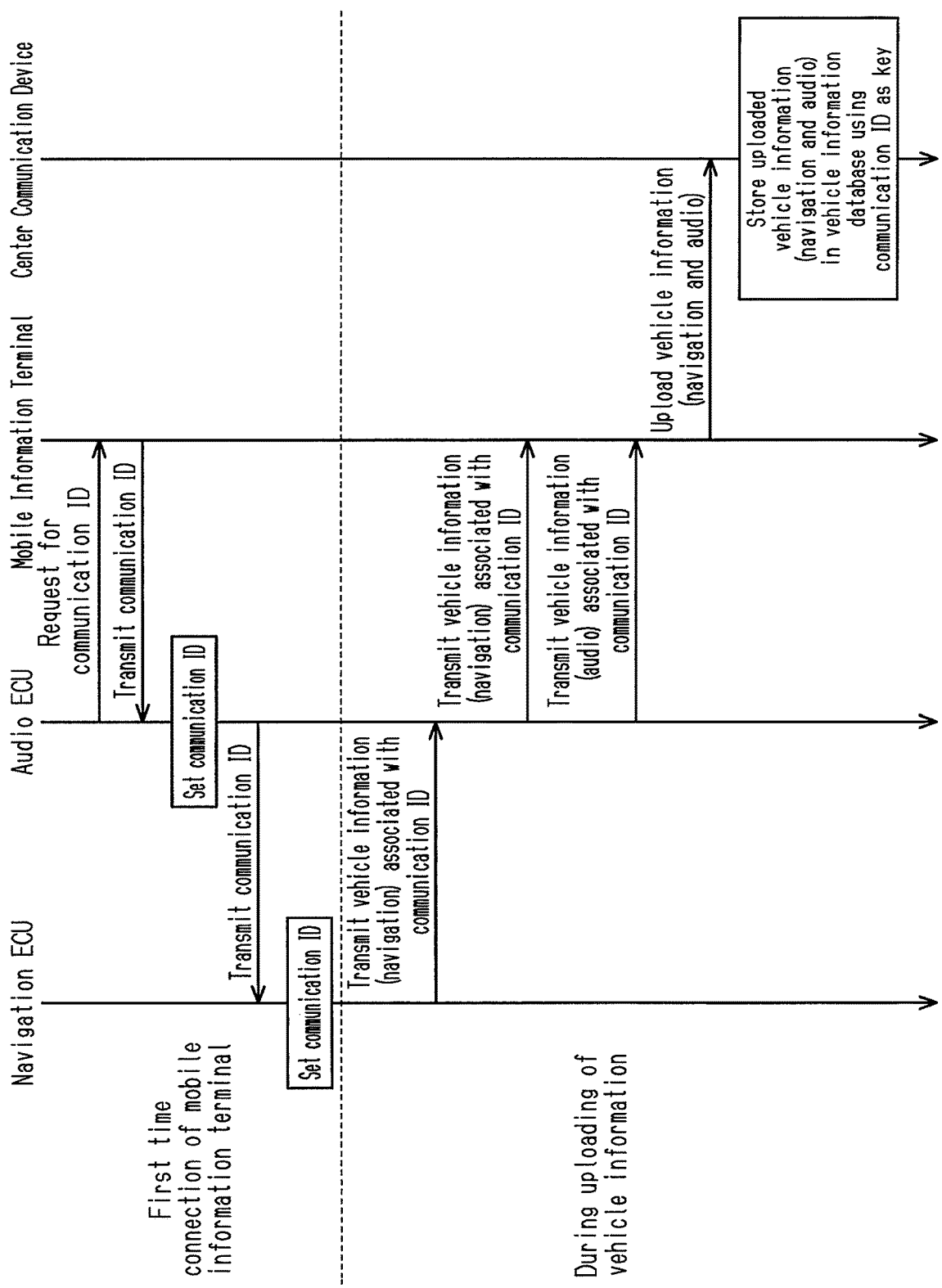
FIG. 11 is a sequence diagram illustrating the flow of information when the vehicle communication system of FIG. 7 uploads the vehicle information to the center.

As illustrated in FIG. 11, when connection with the mobile information terminal 500 through short-range communication is first detected, the audio ECU 200 requests the mobile information terminal 500 to transmit the communication ID.

In response to the request from the audio ECU 200, the mobile information terminal 500 transmits the communication ID 500A to the audio ECU 200 through short-range communication.

When obtaining the communication ID 500A from the mobile information terminal 500, the audio ECU 200 sets the obtained communication ID 500A as data used when transmitting the vehicle information D2 that is manages. Further, the audio ECU 200 transmits the communication ID 500A obtained from the mobile information terminal 500 to the navigation ECU 100 via the communication line S1.

When obtaining the communication ID 500A from the audio ECU 200, the navigation ECU 100 sets the obtained communication ID 500A as data used when transmitting the vehicle information D1 that it manages.

Thereafter, the navigation ECU 100 associates the vehicle information D1 that it manages with the communication ID 500A that is set in advance. Then, the navigation ECU 100 transmits the vehicle information D1 associated with the communication ID 500A to the audio ECU 200. When receiving the vehicle information D1 associated with the communication ID 500A from the navigation ECU 100, the audio ECU 200 transmits the vehicle information D1 associated with the communication ID 500A to the mobile information terminal 500. In the same manner, the audio ECU 200 associates the vehicle information D2 that it manages with the communication ID 500A that is set in advance. Then, the audio ECU 200 transmits the vehicle information D2 associated with the communication ID 500A to the mobile information terminal 500.

When receiving the vehicle information D1 and D2 managed by the navigation ECU 100 or the audio ECU 200 from the audio ECU 200, the mobile information terminal 500 uploads the vehicle information D1 and D2 associated with the communication ID 500A to the center communication device 610.

When receiving the vehicle information D1 and D2 from the navigation ECU 100 or the audio ECU 200 through the mobile information terminal 500, the center communication device 610 stores the received vehicle information D1 and D2 in the vehicle information database 620 using the communication ID 500A as a key.

The operation of the vehicle communication system according to the second embodiment will now be described.

In a vehicle that does not include an on-board communication device, when ECUs installed in the vehicle upload the vehicle information that they manage to the center located outside the vehicle, short-range communication is usually established between one of the ECUs that have a short-range communication function and a mobile information terminal carried by an occupant of the vehicle. Then, the ECU installed in the vehicle uploads the vehicle information to the center located outside the vehicle via the mobile information terminal.

At this time, in the second embodiment, since the on-board communication device 400 is not installed in the vehicle, the ECUs 100 and 200 that upload the vehicle information share the communication ID 500A, which is an ID unique to the mobile information terminal 500, in place of the communication ID 400A, which is an ID unique to the on-board communication device 400 in the first embodiment.

The communication ID 500A of the mobile information terminal 500 is an ID used to identify the mobile information terminal 500 in the network when the mobile information terminal 500 establishes communication with the outside of the vehicle. Further, the communication ID 500A is data that is essential for the mobile information terminal 500. Therefore, there is no need for a separate ECU to write the communication ID 500A in advance to the mobile information terminal 500. Further, the communication ID 500A is, for example, an IMEI that a unique number and assigned to all communication devices. This allows any vehicle capable of performing short-range communication with the mobile information terminal 500 to perform communication using the communication ID 500A and improves versatility of communication using the vehicle information D1 and D2.

Further, when obtaining the vehicle information D1 and D2 from the ECUs 100 and 200 installed in the vehicle, the center 600 stores the vehicle information D1 and D2 in the vehicle information database 620 separately for each vehicle using the communication ID 500A associated with the obtained vehicle information D1 and D2 as a key. This allows the center 600 to manage the vehicle information D1 and D2 obtained from the ECUs 100 and 200 separately for each vehicle.

In particular, in the second embodiment, when connection through short-range communication with the mobile information terminal 500 is detected for the first time, the ECUs 100 and 200 that upload the vehicle information D1 and D2 set the communication ID 500A of the mobile information terminal 500 as data used when transmitting the vehicle information D1 and D2. If the communication ID 500A has been obtained once, the ECUs 100 and 200 no longer update the obtained communication ID 500A even when connection through short-range communication with the mobile information terminal 500 is detected. Therefore, for example, even when multiple occupants of the vehicle each have a mobile information terminal 500, and the different mobile information terminals 500 establish short-range communication with the ECUs 100 and 200, the communication ID 500A shared by the ECUs 100 and 200 that upload the vehicle information D1 and D2 remains the same regardless of the mobile information terminal 500 that establishes short-range communication. This allows the center 600 to manage the vehicle information D1 and D2 separately for each vehicle over the entire period during which the vehicle is used regardless of changes in the mobile information terminal 500 that arbitrates uploading of the vehicle information D1 and D2 from the ECUs 100 and 200.

As described above, the second embodiment has the same advantages as the first embodiment.

It should be apparent to those skilled in the art that the present invention may be embodied in many other specific forms without departing from the spirit or scope of the invention. Particularly, it should be understood that the present invention may be embodied in the following forms.

In the first embodiment, the on-board communication device 400 and the navigation ECU 100 are connected by the communication line S2 that serves as a dedicated communication line, and the navigation ECU 100 and the audio ECU 200 are connected by the communication line S1 that serves as a dedicated communication line. Further, the on-board communication device 400 transmits the communication ID 400A to the navigation ECU 100 via the communication line S2, and the navigation ECU 100 transmits the communication ID 400A to the audio ECU 200 via the communication line S1. Instead, the on-board communication device 400 and the audio ECU 200 may be connected by a dedicated communication line. Further, the on-board communication device 400 may transmit the communication ID 400A to the audio ECU 200 via the dedicated communication line.

In the second embodiment, the mobile information terminal 500 and the audio ECU 200 are connected through short-range communication, and the audio ECU 200 and the navigation ECU 100 are connected by the communication line S1 that serves as a dedicated communication line. Further, the mobile information terminal 500 transmits the communication ID 500A to the audio ECU 200 through short-range communication in response to a request from the audio ECU 200, and the audio ECU 200 transmits the communication ID 500A to the navigation ECU 100 via the communication line S1. Instead, the mobile information terminal 500 and the navigation ECU 100 may be connected through short-range communication. Further, the mobile information terminal 500 may transmit the communication ID 500A to the navigation ECU 100 through short-range communication.

In the first embodiment, the vehicle communication system includes the navigation ECU 100 and the audio ECU 200 that are configured separately from each other. However, the vehicle communication system may include an ECU integrating the functions of the ECUs 100 and 200. In this case, the on-board communication device 400 and integrated ECU may be connected by a dedicated communication line, and the communication ID 400A may be transmitted to the integrated ECU via the dedicated communication line from the on-board communication device 400 in response to a request from the integrated ECU. Further, the integrated ECU may associate the communication ID 400A received from the on-board communication device 400 with the vehicle information D1 and D2 that it manages to transmit the vehicle information D1 and D2 associated with the communication ID 400A to the center 600 through the on-board communication device 400 or the mobile information terminal 500. Moreover, the integrated ECU does not need to have the short-range communication function and may be configured to perform communication with the center 600 through only the on-board communication device 400. In this case, the integrated ECU may associate the communication ID 400A received from the on-board communication device 400 with the vehicle information D1 and D2 which it manages to transmit the vehicle information D1 and D2 associated with the communication ID 400A to the center 600 through the on-board communication device 400.

In the second embodiment, the vehicle communication system includes the navigation ECU 100 and the audio ECU 200 that are configured separately from each other. However, the vehicle communication system may be configured to include an ECU integrating the functions of the ECUs 100 and 200. In this case, the mobile information terminal 500 and integrated ECU may be connected through short-range communication, and the communication ID 500A may be transmitted to the integrated ECU through short-range communication from the mobile information terminal 500 in response to a request from the integrated ECU.

In the first embodiment, the destination of the vehicle information D1 from the navigation ECU 100 via the on-board communication device 400 and the destination of the vehicle information D2 from the audio ECU 200 via the mobile information terminal 500 are both the center 600. However, the destination to which the on-board communication device 400 transmits the vehicle information D1 may differ from the destination to which the mobile information terminal 500 transmits the vehicle information D2.

In the first embodiment, the vehicle information D1 and D2 is uploaded to the center 600 by a communication path selectively routed through the navigation ECU 100 and the audio ECU 200. Instead, the ECUs 100 and 200 may upload the vehicle information D1 and D2 to the center 600 through a communication path routed through the on-board communication device 400 in addition to a communication path routed through the mobile information terminal 500.

In the embodiments described above, the dedicated communication lines S1 and S2 are used as communication paths when the communication IDs 400A and 500A are shared with the navigation ECU 100 and the audio ECU 200. However, if information security can be ensured in the vehicle network NW3, the communication IDs 400A and 500A may be transferred between the ECUs 100 and 200 via the vehicle network NW3. In this case, the dedicated communication lines S1 and S2 may be omitted.

In the embodiments described above, the communication lines S1 and S2 are used as communication paths for both of the communication IDs 400A and 500A and the vehicle information D1 and D2. Instead, the communication lines S1 and S2 may be used as communication paths for the communication IDs 400A and 500A, and the vehicle network NW3 may be used as a communication path for the vehicle information D1 and D2. Further, the vehicle network NW3 may be used as a communication path for the communication IDs 400A and 500A, and the communication lines S1 and S2 may be used as communication paths for the vehicle information D1 and D2.

In the embodiments described above, the audio ECU 200 transmits and receives the vehicle information D1 and D2 to and from the mobile information terminal 500, which is located in the passenger compartment, through short-range communication. Instead of such short-range communication, transmission and reception of the vehicle information D1 and D2 may be performed by connecting the audio ECU 200 and the mobile information terminal 500 with a dedicated communication line.

In the embodiments described above, the navigation ECU 100 and the audio ECU 200 upload vehicle information. However, any ECU connected to the vehicle network NW3 may upload the vehicle information to the center 600.

In the embodiments described above, the IMEI is used as the communication ID 400A of the on-board communication device 400 or the communication ID 500A of the mobile information terminal 500. An Electronic Serial Number (ESN) or a Mobile Equipment Identifier (MEID) may also be used as the communication IDs 400A and 500A. In this manner, any information may be used as the communication IDs 400A and 500A as long as the information is added and assigned to all communication devices including the on-board communication device 400 and the mobile information terminal 500.

The present examples and embodiments are to be considered as illustrative and not restrictive, and the invention is not to be limited to the details given herein, but may be modified within the scope and equivalence of the appended claims.

The invention claimed is:

1. A vehicle communication system comprising:
a first on-board device installed in a vehicle;
a first communication device configured to be connected to the first on-board device;
a second on-board device installed in the vehicle; and
a second communication device configured to be connected to the second on-board device, wherein:
individual identification information used to identify the first communication device as an individual communication terminal is added to the first communication device,
the first communication device is configured to transmit the individual identification information to the first on-board device and the second on-board device, and
the first on-board device is configured to associate vehicle information of the vehicle with the individual identification information and transmit the vehicle information associated with the individual identification information to an information device via the first communication device,
the second on-board device is configured to associate vehicle information of the vehicle with the individual identification information and transmit the vehicle information associated with the individual identification information to another information device via the second communication device,
the information device to which the first communication device transmits the vehicle information and the another information device to which the second communication device transmits the vehicle information include the same information center, and
a dedicated communication line that connects the first communication device and the first on-board device, wherein the first communication device is configured to transmit the individual identification information to the first on-board device via the dedicated communication line.

2. The vehicle communication system according to claim 1,
wherein
the second on-board device is configured to associate vehicle information of the vehicle with the individual identification information and transmit the vehicle information associated with the individual identification information to an information device via the first communication device.

3. The vehicle communication system according to claim 2, further comprising a communication line that connects the first communication device and the second on-board device, wherein the first communication device is configured to transmit the individual identification information to the second on-board device via the communication line.

4. The vehicle communication system according to claim 2, further comprising:
a communication line that connects the first on-board device and the second on-board device, wherein
the first communication device is configured to transmit the individual identification information to the second on-board device via the communication line via the first on-board device.

5. The vehicle communication system according to claim 1, wherein the dedicated communication line is not connected to devices other than the first communication device and the first on-board device.

6. A vehicle communication system comprising:
a first on-board device installed in a vehicle;
a first communication device configured to be connected to the first on-board device; and
a second communication device configured to be connected to the first on-board device, wherein:
individual identification information used to identify the first communication device as an individual communication terminal is added to the first communication device,
the first communication device is configured to transmit the individual identification information to the first on-board device, and
the first on-board device is configured to associate vehicle information of the vehicle with the individual identification information received from the first communication device and transmit the vehicle information associated with the individual identification information to an information device via the second communication device, and transmit the vehicle information associated with the individual identification information to another information device via the first communication device, the information device to which the first communication device transmits the vehicle information and the another information device to which the second communication device transmits the vehicle information include the same information center, and a dedicated communication line that connects the first communication device and the first on-board device, wherein the first communication device is configured to transmit the individual identification information to the first on-board device via the dedicated communication line.

7. The vehicle communication system according to claim 6, wherein the dedicated communication line is not connected to devices other than the first communication device and the first on-board device.

* * * * *